United States Patent [19]

Itoh et al.

[11] Patent Number: 4,722,975
[45] Date of Patent: Feb. 2, 1988

[54] CROSSLINKABLE COPOLYMER COMPOSITION AND A METHOD FOR THE PREPARATION THEREOF

[75] Inventors: Kunio Itoh; Yasuo Tarumi; Tsutomu Nakamura, all of Gunma; Hiroyuki Ohata, Fukui; Tsutomu Matsuo, Fukui; Harukazu Okuda, Fukui, all of Japan

[73] Assignee: Shin-Etsu Chemical Co., Ltd., Tokyo, Japan

[21] Appl. No.: 800,433

[22] Filed: Nov. 21, 1985

[30] Foreign Application Priority Data

Nov. 26, 1984 [JP]  Japan ................................. 59-249360
Nov. 26, 1984 [JP]  Japan ................................. 59-249361

[51] Int. Cl.$^4$ .............................................. C08F 8/42
[52] U.S. Cl. ................................ 525/288; 525/326.5; 525/371; 525/387; 526/279
[58] Field of Search ...................... 525/288, 326.5, 371, 525/387; 526/279

[56] References Cited

U.S. PATENT DOCUMENTS

| | | | |
|---|---|---|---|
| 2,532,583 | 12/1950 | Tyran | 526/279 |
| 2,899,403 | 8/1959 | Lewis | 526/279 |
| 3,369,006 | 2/1968 | Brown | 526/279 |
| 3,650,812 | 3/1972 | Nordstrom et al. | 525/288 |
| 3,714,288 | 1/1973 | Nordstrom | 525/288 |
| 4,153,641 | 5/1979 | Deichert et al. | 525/288 |
| 4,301,231 | 11/1981 | Atarashi et al. | 526/279 |
| 4,530,879 | 7/1985 | Drahnak | 526/279 |

*Primary Examiner*—Joseph L. Schofer
*Assistant Examiner*—Bernard Lipman
*Attorney, Agent, or Firm*—Hopgood, Calimafde, Kalil, Blaustein & Judlowe

[57] ABSTRACT

The inventive copolymer composition is satisfactorily curable or vulcanizable into, for example, a rubbery elastomer even by an organic peroxide contained therein as a crosslinking agent. The crosslinkable copolymer comprised therein is a polymer having, in a molecule, at least two monomeric units each having a vinyl-containing organosilicon pendant group represented by the general formula $(Vi_m R^1{}_n SiO)_a Vi_b R^2{}_c Si-$, in which Vi is a vinyl group, $R^1$ is a hydrogen atom or a group selected from the class consisting of monovalent hydrocarbon groups free from aliphatic unsaturation, hydroxy group and hydrolyzable groups excepting halogen atoms, $R^2$ is a hydrogen atom or a monovalent hydrocarbon group, m is 1, 2 or 3, n is zero, 1 or 2, a is 1, 2 or 3, b is zero, 1 or 2 and c is zero, 1 or 2 with the proviso that $a+b=1$, 2 or 3 and $a+b+c=3$. Such a copolymer can be prepared by the copolymerization of a first ordinary ethylenically unsaturated monomer and a second monomer having, simultaneously in a molecule, an ethylenically unsaturated linkage copolymerizable with the first monomer and the vinyl-containing organosilicon group of the above given formula.

7 Claims, 1 Drawing Figure

CROSSLINKABLE COPOLYMER COMPOSITION AND A METHOD FOR THE PREPARATION THEREOF

BACKGROUND OF THE INVENTION

The present invention relates to a crosslinkable copolymer composition or, more particularly, to a copolymer composition comprising a vinylic, acrylic, styrenic or other organic copolymer and, for example, an organic peroxide as a crosslinking or vulcanizing agent and a method for the preparation thereof.

It is known in the prior art that an organic polymer can be rendered crosslinkable or vulcanizable by introducing organosilicon moieties having a silicon-bonded hydrolyzable group as the monomeric units into the polymeric molecular chain so that exposure of the thus obtained copolymer to atmospheric moisture causes hydrolysis of the silicon-bonded hydrolyzable groups into silanols followed by the silanol condensation therebetween to form intermolecular crosslinks.

For example, U.S. Pat. No. 3,632,557 teaches a urethane polymer terminated at the molecular chain ends with alkoxysilyl groups of the formula $Si(OR)_n$, R being a monovalent hydrocarbon group and n being an integer of 1, 2 or 3; U.S. Pat. No. 3,503,943 teaches an elastomeric copolymer of ethylene, propylene and a dienic monomer having $SiR_2X$ groups, R being as defined above and X being a hydrolyzable group, introduced thereinto by the grafting reaction of hydrosilation with a silane of the formula $HSiR_2X$; Japanese Patent Publication No. 48-1711 teaches an olefinic (co)polymer to which organosilicon moieties having at least two hydrolyzable groups are introduced by the grafting reaction of an organosilane compound having an olefinically unsaturated group by the aid of a free-radical generating agent; U.S. Pat. No. 3,471,440 teaches a dienic polymer having been subjected to an addition reaction with an organosilane compound having a hydrolyzable group; and U.S. Pat. No. 3,971,751 teaches a polyether compound having been subjected to an addition reaction with an organosilane compound having a hydrolyzable group.

A problem in the crosslinkable organic polymers prepared by the above described prior art methods in general is the relatively low velocity of the crosslinking reaction taking an unduly long time for complete curing of the polymer although the crosslinking reaction can proceed even at room temperature by the exposure to the atmospheric moisture as is mentioned above. When the base polymer has a low permeability to moisture, this problem is more serious and the core portion of a thick body of the polymeric composition can hardly be cured to completeness. Moreover, the process of crosslinking by the hydrolysis and silanol condensation reactions necessarily produces volatile byproducts which may adversely affect the properties of the products obtained by the crosslinking or vulcanization.

As is known hitherto, in particular, acrylic rubbers have excellent resistance against heat, oils and ozone in comparison with other synthetic rubbers so that they are widely used in various fields of applications where heat resistance, aging resistance and oil resistance are essential such as sealing materials, gaskets, rubber hoses in chemical plants and the like. The acrylic rubbers currently produced and used industrially include several different types of which the principal monomeric constituent is an acrylic acid ester copolymerized with a relatively small amount of an active chlorine-containing monomer such as 2-chlorovinyl ethers, vinyl monochloroacetate and the like or an epoxy-containing monomer such as glycidyl methacrylate, allyl glycidyl ether and the like.

These prior art acrylic rubbers, however, have several disadvantages and problems that the velocity of vulcanization thereof is considerably smaller than other general-purpose synthetic rubbers requiring a procedure of vulcanization in which the rubber polymer is admixed with a polyamine-based or a sulfur/soap-based vulcanizing agent and heated in press at a temperature of about 170° to 180° C. for several tens of minutes followed by post-vulcanization for several hours, that the rubber compounds formulated with a copolymer of an active chlorine-containing monomer are liable to cause corrosion of metal molds used in the fabrication of rubber articles and that the use of a polyamine-based vulcanizing agent is objectionable when the rubber article is to be used in contact with medicines and foods due to their toxicity.

Various proposals and attempts have been made with an object to overcome the above described disadvantages and problems by introducing unsaturated linkages into the pendant groups on the molecular chain of the rubbery polymer so as to improve the crosslinking behavior, corrosiveness or toxicity of the rubber. For example, an acrylic acid ester is copolymerized with a dienic hydrocarbon compound (see U.S. Pat. No. 2,643,247), derivative of cyclopentadiene (see U.S. Pat. Nos. 3,402,158 and 3,487,057) or cyclohexene (see U.S. Pat. No. 3,497,571) and the like so that the resultant rubbery polymer can be vulcanized with sulfur or an organic peroxide as the vulcanizing agent. The improvements obtained by these modifications are still quite insufficient and impracticable with rather decreased velocity of vulcanization or very poor workability of the rubber compound in processing.

A recently proposed improvement concerns the use of a copolymer of an acrylic ester and a norbornene derivative as the acrylic rubber base which is susceptible to the vulcanization with sulfur or an organic peroxide as the vulcanizing agent. Although the improvement is considerable in respect of the vulcanizability with sulfur, the velocity of vulcanization is still quite unsatisfactory when the vulcanizing agent is an organic peroxide so that this method is also industrially unacceptable.

SUMMARY OF THE INVENTION

It is therefore an object of the present invention to provide a novel polymeric composition capable of being cured or vulcanized by the crosslinking reaction of the copolymer comprised therein without the problems and disadvantages in the above described prior art polymeric compositions.

Another particular object of the present invention is to provide a novel acrylic copolymer capable of being vulcanized into an acrylic rubber without the problems and disadvantages in the prior art acrylic rubbers. It is also the object of the invention to provide a copolymer for an acrylic rubber capable of being satisfactorily vulcanized even with an organic peroxide as the vulcanizing agent as well as an acrylic rubber compound formulated therewith.

A further object of the invention is to provide a method for the preparation of the novel copolymer composition mentioned above.

Thus, the crosslinkable copolymer composition provided by the present invention comprises a polymer having, in a molecule, at least two monomeric units each having a vinyl-containing organosilicon pendant group represented by the general formula $$(Vi_m R^1_n SiO)_a Vi_b R^2_c Si—, \quad (I)$$

in which Vi is a vinyl group, $R^1$ is a hydrogen atom or a group selected from the class consisting of monovalent hydrocarbon groups free from aliphatic unsaturation, hydroxy group and hydrolyzable groups excepting halogen atoms, $R^2$ is a hydrogen atom or a monovalent hydrocarbon group, m is 1, 2 or 3, n is zero, 1 or 2, a is 1, 2 or 3, b is zero, 1 or 2 and c is zero, 1 or 2 with the proviso that $a+b=1$, 2 or 3 and $a+b+c=3$; and a crosslinking agent which is an organic peroxide or a platinum compound.

More particularly, the crosslinkable copolymer composition of the invention comprises:

(A) a copolymer composed of the polymeric chain molecules comprising (a) organic monomeric units derived from an ethylenically unsaturated monomer, and (b) at least two monomeric units in a molecule each having a vinyl-containing organosilicon pendant group represented by the general formula $$(Vi_m R^1_n SiO)_a Vi_b R^2_c Si—, \quad (I)$$

in which each symbol has the meaning as defined above, and (B) a crosslinking agent which is an organic peroxide or a platinum compound.

Accordingly, the above described crosslinkable copolymer composition can be prepared by uniformly admixing a crosslinking agent as the component (B) with a copolymer as the component (A) which is obtained typically by the reaction of free radical-induced copolymerization of a first ethylenically unsaturated comonomer and a second comonomer having, in a molecule, an ethylenically unsaturated linkage copolymerizable with the first comonomer and the group of the general formula (I) in the presence of a free radical polymerization initiator.

It should be mentioned, however, that the method for obtaining the copolymer as the component (A) is not limited to the above described method of copolymerization but can be obtained in several different ways to be described below in detail.

DETAILED DESCRIPTION OF THE PREFERRED EMBODIMENTS

The copolymeric composition as described above is capable of being cured or vulcanized even by the so-called hot air vulcanization under normal pressure by virtue of the combination of the vinyl-containing organosilicon pendant groups in the copolymer as the component (A) and the crosslinking agent as the component (B).

The copolymer contains, in a molecule, at least two monomeric units each having the vinyl-containing organosilicon pendant group of the general formula (I). In the formula, the symbol $R^1$ denotes a hydrogen atom, a monovalent hydrocarbon group free from aliphatic unsaturation, such as alkyl groups, e.g. methyl, ethyl, propyl and butyl groups, aryl groups, e.g. phenyl and tolyl groups, and cycloalkyl groups, e.g. cyclohexyl group, as well as those substituted groups obtained by the replacement of a part or all of the hydrogen atoms in the above named hydrocarbon groups with substituents such as halogen atoms, cyano groups and the like, hydroxy group and hydrolyzable groups excepting halogen atoms, e.g. alkoxy and acyloxy groups. The symbol $R^2$ denotes a hydrogen atom or a monovalent hydrocarbon group exemplified by the same groups as those named above as the examples of $R^1$. The suffixes m, n, a, b and c each have the meaning defined above. Several of the particular examples of the pendant groups expressed by the general formula (I) are those shown by the following formulas, in which the symbols Vi, Me, Et and Ph each denote vinyl, methyl, ethyl and phenyl groups, respectively: ViMe$_2$Si—; ViMePhSi—; ViMe$_2$Si—O—SiMe$_2$—; Vi$_2$MeSi—O—SiMe$_2$—; ViMe(CHMe$_2$)Si—O—SiMe$_2$—; ViMePhSi—O—SiMe$_2$—; Vi$_3$Si—O—SiMe$_2$—; ViMe$_2$Si—O—SiMeVi—; Vi(EtO)$_2$Si—O—SiMe$_2$—; Vi(EtO)MeSi—O—SiMe$_2$—; and (ViSiMe$_2$—O—)$_2$SiMe—.

To explain the advantages obtained with the inventive crosslinkable copolymer composition in more detail, the copolymer as the component (A) characteristically contains at least two monomeric units each having an organosilicon pendant group with at least one vinyl group directly bonded to the silicon atom. When such a copolymer is prepared by the copolymerization of a first ethylenically unsaturated comonomer and an organosilicon monomer having a silicon-bonded vinyl group in a molecule as a second comonomer, it is noteworthy that such a silicon-bonded vinyl group has reactivity quite different from that of the vinyl group in an ordinary vinyl monomer. For example, Japanese Patent Publication No. 55-41704 discloses that, when a mixture of a vinylic or olefinically unsaturated monomer and an organopolysiloxane having at least one vinyl group directly bonded to the silicon atom is brought under a condition for polymerization in the presence of a free-radical polymerization initiator, the polymerization reaction predominantly proceeds of the vinylic or olefinic monomer entirely leaving the vinyl-containing organopolysiloxane unpolymerized so that the resultant polymerizate is a mere mixture of the vinylic or olefinic polymer and the organopolysiloxane with the vinyl groups left unreacted as such. On the contrary, any ethylenically unsaturated linkages in an organosilicon compound bonded to the silicon atom indirectly can be copolymerized with other ethylenically unsaturated monomers. The difference in the polymerizability between the silicon-bonded vinyl group and the indirectly silicon-bonded unsaturation is even more remarkable when the two types of the unsaturated groups are isolated through a highly polarizable siloxane linkage —Si—O—Si— though under influences of other groups bonded to the silicon atom. In particular, siloxane linkages introduced into the copolymer have additional advantages that the cold resistance of the cured product thereof is greatly improved due to the moderated intermolecular force and enhancement in the dispersibility of an inorganic filler in the composition.

In the second comonomer having, simultaneously in a molecule, an ethylenically unsaturated linkage copolymerizable with the first comonomer and the group of the general formula (I), the group of the general formula (I) can be bonded to the ethylenically unsaturated group, e.g. acryloxy, methacryloxy and vinyl groups, copolymerizable with the first comonomer through various kinds of organic linkages such as a propylene group —CH$_2$CH$_2$CH$_2$— and 1,4-phenylene group.

Several of the particular examples of the organosilicon compounds in conformity with the above described definition and usable as the second comonomer to give the monomeric units (b) in the copolymerization with the first comonomer to give the monomeric units (a) include those compounds (S-1) to (S-18) expressed by the following chemical names and/or structural formulas, in which the symbols Me, Et, Vi, Ph and Pn denote a methyl, an ethyl, a vinyl, a phenyl and a 1,4-phenylene group, respectively.

ized with various kinds of ethylenically unsaturated monomers including, for example, ethylene, propylene, butylene, vinyl chloride, vinyl acetate, styrene, α-methylstyrene, vinyl toluenes, vinyl naphthalenes, acrylic and methacrylic esters, e.g. ethyl acrylate, butyl acrylate, methyl methacrylate and the like, vinylidene chloride, vinylidene fluoride, vinylidene cyanide, acrylonitrile, methacrylonitrile, acrylamide and dienic monomers, e.g. butadiene, isoprene, chloroprene and others. The copolymerization can be performed in the presence of a free-radical polymerization initiator. The type of the copolymerization reaction is not particularly limitative including emulsion polymerization, suspension polymerization, solution polymerization and bulk polymerization.

Limiting the ethylenically unsaturated monomer as the first comonomer to an acrylic or methacrylic ester to give a copolymer suitable as a base of an acrylic rubber, the ester may be an alkyl ester or an alkoxy-sub- (S-1) Vinyl dimetyl methacryloxymethyl silane of the formula
Vi—SiMe$_2$—CH$_2$—O—CO—CMe=CH$_2$ (S-2) Vinyl methyl phenyl 3-acryloxypropyl silane of the formula Vi—SiMePh—(CH$_2$)$_3$—O—CO—CH=CH$_2$ (S-3) Vinyl methyl phenyl 3-methacryloxypropyl silane of the formula Vi—SiMePh—(CH$_2$)$_3$—O—CO—CMe=CH$_2$ (S-4) Vinyl dimethyl 4-vinylphenyl silane of the formula
Vi—SiMe$_2$—Pn—Vi (S-5) 1-Vinyl-1,1,3,3-tetramethyl-3-(3-methacryloxypropyl) disiloxane of the formula
Vi—SiMe$_2$—O—SiMe$_2$—(CH$_2$)$_3$—O—CO—CMe=CH$_2$ (S-6) 1-Vinyl-1-phenyl-1,3,3-trimethyl-3-(3-acryloxypropyl) disiloxane of the formula
Vi—SiMePh—O—SiMe$_2$—(CH$_2$)$_3$—O—CO—CH=CH$_2$ (S-7) 1-Vinyl-1-phenyl-1,3,3-trimethyl-3-(3-methacryloxypropyl) disiloxane of the formula
Vi—SiMePh—O—SiMe$_2$—(CH$_2$)$_3$—O—CO—CMe=CH$_2$ (S-8) 1,1-Divinyl-1,3,3-trimethyl-3-(3-methacryloxypropyl) disiloxane of the formula
Vi$_2$SiMe—O—SiMe$_2$—(CH$_2$)$_3$—O—CO—CMe=CH$_2$ (S-9) 1-Vinyl-1,1,3,3-tetramethyl-3-(4-vinylphenyl) disiloxane of the formula
Vi—SiMe$_2$—O—SiMe$_2$—Pn—Vi (S-10) 1-Vinyl-1-isopropyl-1,3,3-trimethyl-3-(3-acryloxypropyl) disiloxane of the formula
Vi—SiMe(CHMe$_2$)—O—SiMe$_2$—(CH$_2$)$_3$—O—CO—CH=CH$_2$ (S-11) 1-Vinyl-1,1,3,3,5,5-hexamethyl-5-(3-acryloxypropyl) trisiloxane of the formula
Vi—SiMe$_2$—O—SiMe$_2$—O—SiMe$_2$—(CH$_2$)$_3$—O—CO—CH=CH$_2$ (S-12) 1-Vinyl-1,1-diethoxy-3,3-dimethyl-3-(3-acryloxypropyl) disiloxane of the formula
Vi(EtO)$_2$Si—O—SiMe$_2$—(CH$_2$)$_3$—O—CO—CH=CH$_2$ (S-13) 1-Vinyl-1,1-diethoxy-3,3-dimethyl-3-(3-methacryloxypropyl) disiloxane of the formula
Vi(EtO)$_2$Si—O—SiMe$_2$—(CH$_2$)$_3$—O—CO—CMe=CH$_2$ (S-14) Bis(vinyl dimethyl siloxy) methyl 3-acryloxypropyl silane of the formula
(ViMe$_2$Si—O—)$_2$SiMe—(CH$_2$)$_3$—CO—CH=CH$_2$ (S-15) Bis(vinyl dimethyl siloxy) methyl 3-methacryloxypropyl silane of the formula
(ViMe$_2$Si—O—)$_2$SiMe—(CH$_2$)$_3$—CO—CMe=CH$_2$ (S-16) α-Vinyl-ω-(3-acryloxypropyl) dimetyl polysiloxane of the formula
Vi—SiMe$_2$—O—(SiMe$_2$—O)$_n$—SiMe$_2$—(CH$_2$)$_3$—CO—CH=CH$_2$,
in which n is zero or a positive integer not exceeding 20

(S-17) α-Vinyl-ω-(3-methacryloxypropyl) dimetyl polysiloxane of the formula
Vi—SiMe$_2$—O—(SiMe$_2$—O)$_n$—SiMe$_2$—(CH$_2$)$_3$—CO—CMe=CH$_2$,
in which n has the same meaning as defined above (S-18) 1-Vinyl-1,1,3,3-tetramethyl-3-[2-(4-vinylphenyl)ethyl] disiloxane of the formula
ViMe$_2$Si—O—SiMe$_2$—(CH$_2$)$_2$—Pn—Vi The above described organosilicon compound having a silicon-bonded vinyl group and an ethylenically unsaturated linkage indirectly bonded to the silicon atom simultaneously in a molecule can be copolymerstituted alkyl ester of which the alkyl or alkoxy-substituted alkyl group may have 1 to 8 carbon atoms exemplified by methyl group, ethyl group, propyl group, n-, iso- and tert-butyl groups, pentyl group, hexyl group, 2-ethylhexyl group, n-octyl group and the like as the alkyl groups and 2-methoxyethyl group, 2-ethoxyethyl group and the like as the alkoxy-substituted alkyl groups. It is noted that the chain length of or number of carbon atoms in the ester residue, i.e. the alkyl or alkoxy-substituted alkyl group, has influences on the properties of the resultant rubbery acrylic copolymer. For example, increase of the chain length has an effect of imparting elastic resiliency to the vulcanized rubber formulated with the acrylic copolymer while decrease in the chain length has an effect to improve the rubbery vulcanizate in respect of the tensile strength, oil resistance and heat resistance.

The proportion of the organosilicon compound as the second comonomer to the above mentioned first comonomer should be such that the resultant copolymer should have at least two pendant groups having a silicon-bonded vinyl group in a molecule. When the copolymer is desired to be a base polymer of an acrylic rubber, the polymerization mixture should be composed of from 60 to 99.99 parts by weight of the (meth)acrylic monomer and from 0.01 to 10 parts by weight or, preferably, from 0.1 to 5 parts by weight of the organosilicon monomer. When the proportion of the organosilicon monomer is smaller than above, the acrylic copolymer cannot be imparted with a sufficiently high velocity of vulcanization with an organic peroxide while an excessive amount thereof may result in an excessively high density of crosslinks with consequent decrease in the physical properties of the vulcanized rubber.

The copolymerization reaction of the monomer mixture composed of the above described first and second comonomers can be performed by use of a free-radical polymerization initiator exemplified by the water-soluble inorganic peroxides and persulfates, e.g. ammonium persulfate, potassium persulfate, hydrogen peroxide and the like, and the monomer-soluble organic peroxides and azo compounds, e.g. benzoyl peroxide, lauroyl peroxide, azobisisobutyronitrile, diisopropyl peroxy dicarbonate and the like. The monomer-soluble polymerization initiator should have such a rate of spontaneous thermal decomposition that the temperature at which the half period thereof is 10 hours is 80° C. or higher. The copolymerization reaction is performed at a temperature in the range from 0° to 80° C.

When the copolymerization reaction is desired to be performed at 40° C. or below, the polymerization initiator should preferably be a redox-type catalyst system by combining a reducing agent with the above mentioned oxidative initiators. For example, the above named water-soluble initiators can be combined with iron (II) sulfate as a reducing agent and benzoyl peroxide as a typical monomer-soluble initiator can be combined with N,N-dimethyl aniline to give quite satisfactory results.

Alternatively, the vinyl-containing organosilicon pendant group of the general formula (I) can be introduced into a polymer containing aliphatic unsaturation by the hydrosilation reaction of the double bonds in the molecular chain of a polymer, such as a polymer of a diene or a copolymer of a diene and other ethylenically unsaturated monomers, with an organosilane compound having a silicon-bonded hydrogen atom and a silicon-bonded halogen atom such as Me$_2$HSiX, X being a halogen atom, to introduce —SiX groups into the polymer followed by the reaction of the silicon-bonded halogen atoms with a lithium compound of the formula ROLi, in which R is the vinylcontaining organosilicon group of the general formula (I), such as ViMe$_2$SiOLi, ViMe$_2$Si$-$(-SiMe$_2$—O-)$_n$-OLi and the like to establish a siloxane linkage —Si—O—Si—.

Further alternatively, a phenol novolac resin is reacted with lithium hydroxide so as to partially convert the phenolic hydroxy groups to —OLi groups of the salt form and the lithium derivative of the phenol novolac is reacted with an vinyl-containing organosilicon compound of the formula, for example, R—CH$_2$CH$_2$CH$_2$Cl, R being as defined above, so that the group R is bonded to the aromatic ring of the novolac through a linkage of —O—CH$_2$CH$_2$CH$_2$—.

The polymeric component obtained in the above described manner is then compounded with a crosslinking agent which may be an organic peroxide as a first class. The organic peroxide useful in this case is exemplified by benzoyl peroxide, 2,4-dichlorobenzoyl peroxide, dicumyl peroxide, di-tert-butyl peroxide, 2,5-dimethyl-2,5-di(tert-butyl peroxy) hexane, tert-butyl perbenzoate, 1,3-bis(tert-butyl peroxy isopropyl) benzene, cumyl tert-butyl peroxide and the like.

The amount of the organic peroxide in the inventive copolymer composition should be in the range from 0.2 to 10 parts by weight per 100 parts by weight of the copolymer having the vinyl-containing organosilicon pendant groups to give a copolymer composition curable or vulcanizable in an adequate velocity when heated at a temperature of 120° to 350° C. The curing or vulcanization temperature should be controlled depending on the type of the particular process to give a cured or vulcanized polymeric or rubbery body free from voids or blistering. For example, a temperature of 120° to 200° C. is suitable for the compression molding of the composition in a metal mold while the temperature in the extrusion molding and hot-air vulcanization can be in the range from 120° to 350° C. depending on the type of the copolymer.

The other class of the crosslinking agent includes platinum compounds such as chloroplatinic acid known as a catalyst for the hydrosilation reaction between a silicon-bonded hydrogen atom and an aliphatically unsaturated linkage. Accordingly, it is preferable that the platinum compound is admixed with the polymer in combination with such an organosilicon compound or, preferably, an organopolysiloxane having at least two or, preferably, at least three hydrogen atoms directly bonded to the silicon atoms in a molecule, in particular, when the pendant group represented by the general formula (I) has no such a silicon-bonded hydrogen atom as the group R$^1$ or R$^2$. In view of the compatibility with the copolymer, such an organopolysiloxane having silicon-bonded hydrogen atoms should have a relatively low molecular weight, for example, having 10 or less silicon atoms in a molecule. Several examples of such an organohydrogenpolysiloxane include the following compounds: Me$_3$Si$-$(-O—SiHMe-)$_m$O—SiMe$_3$, m being a positive integer of 2 to 10; phenyl tris(dimethylsiloxy) silane of the formula PhSi(—O—SiHMe$_2$)$_3$; 1,3,5,7-tetramethyl cyclotetrasiloxane of the formula 1-butyl-1,3,5,7-tetramethyl cyclotetrasiloxane of the formula Bu being a butyl group; and copolymeric organopolysiloxane composed of the units of $Me_2HSiO_{0.5}$ and $SiO_2$ in a molar ratio of 1 to 2. The composition formulated with a combination of a platinum compound and an organohydrogenpolysiloxane can be cured by keeping at room temperature or by heating at an elevated temperature according to need.

The above described crosslinkable copolymer composition of the invention can further be admixed, according to need, with various kinds of additives known and conventionally used in the art of polymer processing including inorganic and organic fillers, e.g. various grades of silica or siliceous fillers, calcium carbonate, clay, talc, aluminum hydroxide, alumina, boron nitride, titanium dioxide, iron oxide, carbon black, graphite powder, carbon fibers, glass fibers and the like in combination with or without a carbon-functional silane compound as a priming agent, e.g. vinyl trimethoxy silane, 3-mercaptopropyl trimethoxy silane, 3-methacryloxypropyl trimethoxy silane, glycidyloxypropyl trimethoxy silane and the like; curing accelerators; known crosslinking agents; coloring agents; antioxidants; ultraviolet absorbers and so on.

In the following, examples are given to illustrate the invention in more detail. In the examples, the expression of "parts" always refers to "parts by weight".

EXAMPLE 1

Into a hermetically sealable reaction vessel equipped with a stirrer were introduced, after flushing of inside with nitrogen, 200 parts of water and 2 parts of sodium lauryl sulfate and then, after control of the temperature of the mixture at 30° C., 0.1 part of ammonium persulfate, 0.1 part of sodium hydrogensulfite and 0.001 part of iron (II) sulfate. Thereafter, a monomer mixture composed of 99 parts of ethyl acrylate and 1 part of 1-vinyl-1,1,3,3-tetramethyl-3-(3-methacryloxypropyl) disiloxane (S-5) was added dropwise to the mixture in the vessel under agitation over a period of 3 hours while the temperature of the mixture in the vessel was kept at 30° C. throughout followed by further continued agitation of the mixture for additional 1 hour to complete the copolymerization in an aqueous emulsion.

The thus obtained milky white aqueous emulsion was subjected to salting-out with addition of an aqueous solution of calcium chloride to separate the copolymer which was washed with water and dried to give an acrylic copolymer as the product in a yield of 99.5%. This acrylic copolymer had a Mooney viscosity $[ML_{1+4} (100° C.)]$ of 51.

A rubber compound was prepared by uniformly blending 100 parts of the above obtained acrylic copolymer, 40 parts of a finely divided silica filler, 1 part of stearic acid and 5 parts of zinc oxide on a two-roller mill followed by milling on the roller kept at 110° C. for 30 minutes to remove the moisture content in the silica filler and then admixing of 2 parts of a 50% by weight pasty mixture of 2,4-dichlorobenzoyl peroxide. The thus obtained rubber compound was shaped into sheets which were vulcanized by heating for 3 minutes in a hot-air oven at 250° C. The result of the vulcanization was quite satisfactory without foaming or blistering at all. Following Table 1 gives the results of the determination of the mechanical properties of the rubber sheets as vulcanized as well as after an oil immersion test by dipping the sheet in a #3 oil at 150° C. for 70 hours and after a heat resistance test by heating at 180° C. for 70 hours carried out according to the procedure specified in JIS K 6301.

TABLE 1

|  | As vulcanized | After immersion in oil | After heat resistance test |
|---|---|---|---|
| Hardness (JIS) (increase, point) | 61 | (−9) | (+8) |
| Tensile strength, $kg/cm^2$ (% increase) | 118 | (−2) | (+21) |
| Ultimate elongation, % (% increase) | 320 | (−32) | (−30) |
| Tear strength, kg/cm | 35 | — | — |
| Elastic resilience, % | 6 | — | — |
| Permanent compression set after 70 hours at 150° C. | 77 | — | — |
| Volume increase, % | — | +17 | — |

EXAMPLE 2

Into a hermetically sealable reaction vessel equipped with a stirrer were introduced, after flushing of inside with nitrogen, 230 parts of water and 0.04 part of a hydroxypropyl methyl cellulose (Metholose 60SH-4000, a product by Shin-Etsu Chemical Co.) to form an aqueous polymerization medium and then a monomer mixture composed of 85.5 parts of butyl acrylate, 12.5 parts of acrylonitrile and 2.0 parts of vinyl methyl phenyl 3-acryloxypropyl silane (S-2) was added to and dispersed in the aqueous medium. Thereafter, the temperature of the mixture in the vessel was controlled at 45° C. and 1.0 part of diisopropyl peroxy dicarbonate (Peroyl IPP, a product by Nippon Yushi Kogyo Co.) was added to the vessel to start the copolymerization reaction which was continued for 3 hours at 45° C. with agitation followed by further agitation of the mixture for additional 1 hour at 50° C. to complete the reaction. The thus obtained polymerizate slurry was dehydrated by filtration and dried to give an acrylic copolymer in a beadlike form of 0.5 to 2 mm diameter in a yield of 96%. The copolymer had a Mooney viscosity $[ML_{1+4} (100° C.)]$ of 55.

A rubber compound was prepared by uniformly blending 100 parts of the acrylic copolymer, 50 parts of a FEF carbon black, 1 part of stearic acid, 5 parts of zinc oxide and 2 parts of a 65% by weight pasty mixture of tert-butyl cumyl peroxide on a two-roller mill at room temperature and the rubber compound was shaped and vulcanized into a rubber sheet by the vulcanization under compression at 170° C. for 15 minutes. The rubber sheet had properties of: hardness of 55 (JIS); tensile strength of 112 $kg/cm^2$; ultimate elongation of 410%; and tear strength of 30 kg/cm.

EXAMPLES 3 to 8

An acrylic copolymer was prepared in each of these Examples in substantially the same manner as in Example 1. The monomer mixture in each of the Examples was composed of one or a combination of the acrylic monomers and a polymerizable organosilicon compound together with or without acrylonitrile in the formulation indicated in Table 2 below which also includes the Mooney viscosity [$ML_{1+4}$ (100° C.)] of the thus obtained acrylic copolymers.

The acrylic copolymers were each processed into a rubber compound by uniformly blending 100 parts of the copolymer, 50 parts of a FEF carbon black, 1 part of stearic acid, 5 parts of zinc oxide and 2 parts of a 65% by weight pasty mixture of tert-butyl cumyl peroxide in each of Examples 3 to 5 or a 50% by weight pasty mixture of 2,4-dichlorobenzoyl peroxide in each of Examples 6 to 8. The rubber compound was shaped into a sheet and subjected to vulcanization by pressing the sheet at 170° C. for 15 minutes in Examples 3 to 5 or by heating the sheet at 250° C. for 3 minutes in a hot-air oven under normal pressure in eaqch of Examples 6 to 8. Table 2 also summarizes the mechanical properties of the thus obtained rubber sheets.

COMPARATIVE EXAMPLES 1 AND 2

The emulsion copolymerization was carried out in substantially the same manner as in Example 1 in which the monomer mixture was composed of 96 parts of ethyl acrylate and 4 parts of ethylidene norbornene in Comparative Example 1 or 96 parts of ethyl acrylate and 4 parts of allyl glycidyl ether in Comparative Example 2 to give acrylic copolymers having a Mooney viscosity [$ML_{1+4}$ (100° C.)] of 45 and 40, respectively.

TABLE 2

| Example No. | 3 | 4 | 5 | 6 | 7 | 8 |
|---|---|---|---|---|---|---|
| (Monomers taken, parts) | | | | | | |
| Ethyl acrylate | — | 99.5 | 99.9 | 97 | 48 | — |
| n-Butyl acrylate | 87.3 | — | — | — | 25 | 89 |
| 2-Methoxyethyl acrylate | — | — | — | — | 26 | — |
| Acrylonitrile | 12.5 | — | — | — | — | 10 |
| (S-1) | — | — | — | 3 | — | — |
| (S-2) | — | — | 0.1 | — | — | — |
| (S-4) | — | 0.5 | — | — | — | — |
| (S-5) | 0.2 | — | — | — | 1 | — |
| (S-10) | — | — | — | — | — | 1 |
| Mooney viscosity | 39 | 48 | 42 | 55 | 50 | 41 |
| (Mechanical properties) | | | | | | |
| Hardness (JIS) | 52 | 58 | 56 | 61 | 46 | 50 |
| Tensile strength, kg/cm$^2$ | 105 | 113 | 103 | 124 | 108 | 110 |
| Ultimate elongation, % | 480 | 350 | 470 | 250 | 470 | 450 |
| Tear strength, kg/cm | 33 | 28 | 26 | 35 | 31 | 30 |

Each of the acrylic copolymers was processed into a rubber compound by uniformly blending 100 parts of the copolymer, 50 parts of a FEF carbon black, 1 part of stearic acid, 5 parts of zinc oxide and 2 parts of a 65% by weight pasty mixture of tert-butyl cumyl peroxide in Comparative Example 1 or 2 parts of zinc dimethyl dithiocarbamate in Comparative Example 2. The rubber compounds were shaped into sheets and vulcanized by heating under compression at 170° C. for 15 minutes followed by post-vulcanization in a Geer's oven at 170° C. for 3 hours. The mechanical properties of the rubber sheets as press-vulcanized and after the post-vulcanization are summarized in Table 3 below.

TABLE 3

| Comparative Example No. | | 1 | 2 |
|---|---|---|---|
| As press-cured | Hardness (JIS) | 46 | 52 |
| | Tensile strength, kg/cm$^2$ | 64 | 85 |
| | Ultimate elongation, % | 520 | 480 |
| | Tear strength, kg/cm | 17 | 22 |

TABLE 3-continued

| Comparative Example No. | | 1 | 2 |
|---|---|---|---|
| After post-vulcanization | Hardness (JIS) | 68 | 57 |
| | Tensile strength, kg/cm$^2$ | 128 | 125 |
| | Ultimate elongation, % | 340 | 310 |
| | Tear strength, kg/cm | 30 | 33 |

Concurrently with the above described tests, hot air vulcanization of the rubber sheets was attempted but the results were quite unsatisfactory to give only semi-vulcanized rubber sheets with remarkable blistering in each of the rubber compounds of Comparative Example 1 and Comparative Example 2 where the zinc dimethyl dithiocarbamate was replaced with the same amount of a 50% by weight pasty mixture of 2,4-dichlorobenzoyl peroxide.

Figure 1:
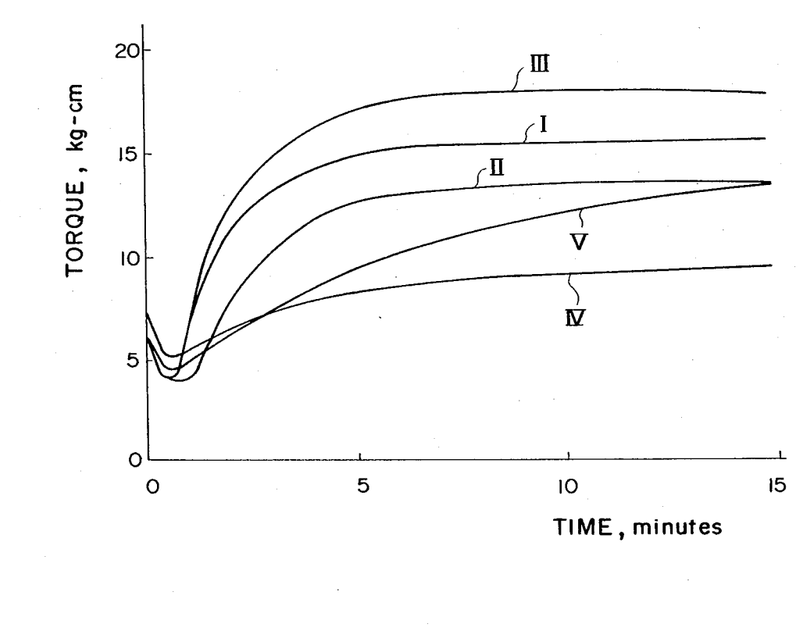
The FIGURE illustrates time vs. torque vulcanization diagrams of the acrylic rubber compounds prepared in Examples and Comparative Examples.

The FIGURE of the accompanying drawing illustrates the time vs. torque vulcanization diagrams of the rubber compounds prepared in Examples 1, 3 and 6 (curves I, II and III, respectively) and Comparative Examples 1 and 2 (curves IV and V, respectively) at 170° C. taken with a JSR Curastometer Model III. As is clearly understood from these results, the acrylic rubber compounds of the Comparative Examples could be fully vulcanized only by a lengthy post-vulcanization following the step of press-vulcanization due to the low velocity of vulcanization. In contrast thereto, the velocity of vulcanization of the acrylic rubber compounds according to the invention was remarkably high, especially, in the early stage of vulcanization so that the vulcanization could be completed within a greatly decrreased time and the rubber compounds could be fully and satisfactorily vulcanized even by the hot-air vulcanization under normal pressure to give a great industrial advantage.

EXAMPLE 9

Into an autoclave of 1 liter capacity equipped with a stirrer were introduced 215 g of vinyl acetate, 8.7 g of a vinyl- and 3-methacryloxypropyl-containing organosiloxane compound of the formula (S-7) given before, 100 g of tert-butyl alcohol and 0.5 g of azobisisobutyronitrile to form a polymerization mixture, from which the dissolved air was purged by blowing nitrogen gas thereinto for about 3 minutes. Thereafter, the autoclave was closed and the air inside the autoclave was purged by replacing three times with a pressurized nitrogen gas of 10 kg/cm$^2$G pressure and further by replacing the nitrogen gas in the same manner with ethylene gas. Then, the stirrer was turned on and the polymerization mixture in the autoclave was heated up to 65° C. while ethylene gas was pressurized thereinto to give a pressure of 40 kg/cm$^2$G to perform the copolymerization reaction at 65° C. for 3 hours. After completion of the reaction and cooling of the polymerization mixture to room temperature, the unreacted ethylene was purged out of the autoclave and the polymerization mixture was poured into a large volume of water to precipitate the polymer which was purified by dissolving in acetone and precipitating with water to give 188 g of a purified polymer product (referred to as the copolymer 9A hereinbelow).

For comparison, the same procedure of the copolymerization as above was repeated excepting the omission of the organosilicon compound S-7 to give 178 g of a copolymer (referred to as the copolymer 9B hereinbelow).

Two copolymer compositions were prepared each by uniformly blending on a two-roller mill 100 parts of the copolymer 9A or 9B, 35 parts of a finely divided precipitated silica filler (Nipsil VN3, a product by Nippon Silica Co.), 5 parts of zinc oxide, 1 part of calcium stearate and 0.7 part of vinyl tris(2-methoxyethoxy) silane. Each of the compositions was heated for 30 minutes on the roller at 100° C. to remove the moisture contained in the silica filler and then, after decreasing the temperature of the roller to 20° C. or below, 2.5 parts of a 50% paste of 2,2-bis(tert-butyl peroxy) butane were added to and uniformly dispersed in the composition by milling for 5 minutes. Each of the thus prepared polymer compositions was molded and vulcanized by heating in a metal mold at 160° C. for 15 minutes under a pressure of 70 kg/cm$^2$ to give a rubbery sheet having a thickness of 2 mm. The thus vulcanized rubber sheet prepared of the copolymer 9A had a hardness (JIS) of 52, tensile strength of 80 kg/cm$^2$, tear strength of 18 kg/cm and ultimate elongation of 270% while the rubber sheet prepared of the copolymer 9B was found to have been only incompletely vulcanized and have very poor mechanical properties.

In the next place, another copolymer composition was prepared by uniformly blending on a two-roller mill 50 parts of the copolymer 9A, 50 parts of an EPDM rubber (EPT 3045, a product by Mitsui Petrochemical Co.), 40 parts of the same silica filler as used above, 7 parts of a hydroxy-terminated silicone fluid expressed by the structural formula HO$-$(SiPh$_2$—O)$_{\overline{2}}$(SiMe$_2$—O)$_{\overline{8}}$H, 5 parts of zinc oxide, 1 part of calcium stearate and 1 part of bis(3-triethoxysilylpropyl) tetrasulfide. After continued milling for 30 minutes on the roller at 100° C. to remove the moisture and then cooling, 2 parts of a 70% paste of tert-butyl cumyl peroxide were added to and uniformly dispersed in the composition and the copolymer composition taken out of the roller mill was molded and vulcanized in a metal mold at 170° C. for 15 minutes under a pressure of 70 kg/cm$^2$ to give a vulcanized rubber sheet of 2 mm thickness, which had excellent mechanical propertries of the hardness (JIS) of 73, tensile strength of 110 kg/cm$^2$, tear strength of 23 kg/cm and ultimate elongation of 360%. The oil resistance test of the rubber sheet gave a result that the swelling with oil was 45% after dipping for 72 hours in ASTM No. 1 oil at 100° C., the degree of swelling being only about a half of that of a similar rubber sheet prepared of the EPDM rubber alone without being combined with the copolymer 9A.

EXAMPLE 10

Into a solution prepared by dissolving 500 g of an ethylene-propylene copolymeric rubber having an iodine value of 15 (EP-24, a product by Nippon EP Rubber Co.) in 5000 g of xylene with addition of chloroplatinic acid in an amount of 10 ppm as platinum based on the amount of the rubber were added dropwise 50 g of dimethyl chlorosilane over a period of 1 hour and the mixture was heated for 3 hours under reflux of the solvent to effect the platinum-catalyzed addition reaction. Thereafter, the temperature of the mixture was further increased to remove the unreacted dimethyl chlorosilane by distillation followed by cooling to room temperature.

The reaction mixture was then admixed with 50 g of vinyl dimethyl silanol Me$_2$ViSiOH and an excess amount of triethyl amine and the mixture was vigorously agitated for 1 hour to effect the dehydrochlorination reaction by which (vinyl dimethylsiloxy) dimethyl silyl units ViMe$_2$Si—O—SiMe$_2$— were introduced into the rubber molecules as the vinyl-containing pendant groups. The mixture was thereafter introduced into a kneader and heated therein with bubbling of nitrogen gas so as to remove the xylene as the solvent and the unreacted organosilane compound followed by several times of washing with water at 50° C. and then drying by heating at 100° C. to remove the water.

A rubber composition was prepared by uniformly blending at 100° C. for 30 minutes in the kneader 100 parts of the thus obtained rubbery polymer, 2 parts of diphenylsilane diol, 40 parts of a finely divided fumed silica filler (Aerosil R-972, a product by DEGUSSA Co.), 1 part of stearic acid, 5 parts of zinc oxide, 10 parts of a process oil (Sunpar 2280, a product by Sun Oil Co.), 5 parts of a hydroxy-terminated dimethylsilicone fluid expressed by the formula HO$-$(SiMe$_2$—O)$_{\overline{10}}$H and 1 part of bis(triethoxysilylpropyl) tetrasulfide. The thus obtained rubber composition was discharged out of the kneader and further admixed on a two-roller mill with 2 parts of a 50% paste of 2,4-dichlorobenzoyl peroxide.

The rubber composition was extruded out of a screw extruder of 40 mm diameter into a form of a string of 3 mm diameter which was heated and vulcanized by passing through a hot-air vulcanization column at 250° C. taking 30 seconds of the staying time therein to find that the vulcanization was complete without blistering at all. A rubber vulcanizate sheet separately prepared of the same rubber composition had mechanical properties of a hardness (JIS) 55, ultimate elongation 630%, tensile strength 145 kg/cm$^2$ and tear strength 40 kg/cm.

For comparison, the same procedure of preparation as described above was repeated except that the ethylene-propylene copolymeric rubber was used as such without introducing the vinyl-containing organosilicon pendant groups. The results were that the rubber string after the hot-air vulcanization was only in a semi-vulcanized state.

EXAMPLE 11

An acrylic rubber (Hycar 4021, a product by Goodrich Co.) was dissolved in methyl isobutyl ketone in a concentration of 25% and the solution was admixed with a lithium-terminated organopolysiloxane of the formula Vi$_2$MeSi—O$-$(SiMe$_2$—O)$_{\overline{3}}$Li by dropwise addition in an amount of 1.5 moles per mole of the —OCH$_2$CH$_2$Cl groups contained in the rubber and the mixture was heated at 50° C. for 2 hours under agitation followed by filtration and several times of washing with hot water. Removal of the solvent from the mixture by distillation gave a rubbery polymer.

A rubber composition was prepared by uniformly blending, in a pressurizable kneader at 100° C. for 30 minutes, 100 parts of the above obtained rubbery polymer, 40 parts of a finely divided silica filler (Nipsil VN$_3$, a product by Nippon Silica Co.), 10 parts of calcium carbonate filler, 5 parts of the same hydroxy-terminated dimethylsilicone fluid as used in the preceding example, 0.5 part of stearic acid and 5 parts of zinc oxide. Further, the rubber blend was admixed with 2 parts of a 50% paste of 2,4-dichlorobenzoyl peroxide on a two-roller mill and shaped into a sheet of 2 mm thickness, which was heated for 3 minutes in a hot-air oven at 250° C. to find that the rubber sheet was completely vulcanized without blistering at all. Instead of the hot-air vulcanization above, the unvulcanized rubber sheet was subjected to compression vulcanization at 120° C. for 15 minutes under a pressure of 100 kg/cm² followed by post-vulcanization at 150° C. for 2 hours to give a vulcanized rubber sheet having mechanical properties of a hardness (JIS) of 73, ultimate elongation of 405%, tensile strength of 126 kg/cm², tear strength of 30 kg/cm and permanent compression set of 30% after 72 hours at 100° C.

EXAMPLE 12

A mixture of 75 g of 10% by weight aqueous solution of a completely saponified polyvinyl alcohol and 90 g of water in a four-necked flask of 500 ml capacity was heated at 70° C. and a mixture of 60 g of vinyl acetate and 13 g of a vinyl-containing organosilicon compound expressed by the formula (S-6) given before was added dropwise thereinto over a period of 2 hours along with concurrent dropwise addition of 10 ml of a 4.5% aqueous solution of hydrogen peroxide containing 0.5 g of tartaric acid at a constant rate over a period of 2 hours. After completion of the dropwise addition of the mixture or solution mentioned above, the reaction mixture in the flask was further agitated at 78° to 82° C. for 60 minutes followed by dilution with methyl alcohol and pouring into a large volume of water to precipitate the polymer which was washed several times with hot water.

The thus obtained polymer was dissolved in acetone and admixed with 2% of dicumyl peroxide followed by removal of the solvent at 50° C. under a reduced pressure of 5 mmHg. The polymer admixed with the peroxide was shaped by compression molding at 150° C. for 15 minutes under a pressure of 120 kg/cm² into a sheet of 1 mm thickness which was found to have been fully vulcanized and to be insoluble in toluene and tertbutyl alcohol.

EXAMPLE 13

A phenol novolac resin in an amount of 50 g was dissolved in 100 ml of methyl ethyl ketone followed by the addition of 6 g of lithium hydroxide so that the phenolic hydroxy groups in the phenol novolac resin were partially converted into the form of lithium salt. Thereafter, the mixture was admixed dropwise with 73 g of 1-(3-chloropropyl)-3-vinyl-1,1,3,3-tetramethyl disiloxane over a period of 30 minutes under reflux and then further heated for additional 1 hour under reflux. The precipitates formed in the mixture were removed by filtration and the filtrate solution was washed with water to neutrality.

The solution was freed from methyl ethyl ketone by distillation and then from the unreacted organosilicon compound at 120° C. under a reduced pressure of 1 mmHg to give a resinous polymer expressed by the structural formula in which m and n are each a positive integer.

Thereafter, 100 parts of the thus obtained resinous polymer were blended with 10 parts of phenyl tris(-dimethylsiloxy) silane, 0.2 part of a propanol solution of chloroplatinic acid containing 2 ppm of platinum and 300 parts of a fine quartz powder having an average particle diameter of 5 μm (Crystallite, a product by Tatsumori Co.) to give a powdery resin composition which was molded at 160° C. for 30 minutes under a pressure of 70 kg/cm² to give a shaped article having a flexural strength of 7 kg/mm².

What is claimed is:
1. A crosslinkable copolymer composition which comprises a polymer having, in a molecule, at least two monomeric units each having a vinyl-containing organosilicon pendant group represented by the general formula in which Vi is a vinyl group, R₁ is a selected from the group consisting of a hydrogen atom, an alkyl group, an aryl group, a cycloalkyl group, a hydroxy group, R² is a hydrogen atom, an alkyl group, an aryl group, or an cycloalkyl group, m is 1, 2, or 3, n is zero, 1 or 2, a is 1, 2, or 3, b is zero, 1 or 2 and c is zero, 1 or 2 with the proviso that a+b=1, 2 or 3 and a+b+c=3; and a crosslinking agent which is an organic perioxide or chlorplatinic acid.

2. A crosslinkable copolymer composition which comprises: (A) a copolymer composed of the polymeric chain molecules comprising
(a) organic monomeric untis derived from an ethylenically unsaturated monomer, and
(b) at least two monomeric units in a molecule each having a vinyl-containing organosilicon pendant group represented by the general formula in which Vi is a vinyl group, R¹ is selected from the group consisting of a hydrogen atom, an alkyl group, an aryl group, a cycloalkyl group, or a hydroxy group, R² is selected from the group consisting of a hydrogen atom, an alkyl gorup, an aryl group or cycloalkyl group, m is 1, 2 or 3, n is zero, 1 or 2, a is 1, 2 or 3, b is zero, 1 or 2 and c is zero, 1 or 2 with the proviso that a+b=1, 2 or 3 and a+b+c=3; and (B) a crosslinking agent which is an organic peroxide or chloroplatinic acid.

3. The crosslinkable copolymer composition as claimed in claim 1 wherein the vinyl-containing organosilicon pendant group is selected from the class consisitng of the groups expressed by the structural formulas ViMe₂Si—; ViMePhSi—; ViMe₂Si—O—SiMe₂—; Vi₂MeSi—O—SiMe₂—; ViMe(CHMe₂)Si—O—SiMe₂—; ViMePhSi—O—SiMe₂—; Vi₃Si—O—SiMe₂—; ViMe₂Si—O—SiMeVi—; Vi(EtO)₂Si—O—SiMe₂—; Vi(EtO)MeSi—O—SiMe₂—; and (ViSiMe₂—O—)₂SiMe—, in which the symbols Me, Et, Vi and Ph denote methyl, ethyl, vinyl and phenyl groups, respectively.

4. The crosslinkable copolymer composition as claimed in claim 1 wherein the crosslinking agent is chloroplatinic acid in combination with an organohydrogenpolysiloxane having, in a molecule, at least three hydrogen atoms directly bonded to the silicon atoms.

5. The crosslinkable copolymer composition as claimed in claim 2 wherein the ethylenically unsaturated monomer from which the organic monomeric units as the moiety (a) are derived is selected from the group consisting of ethylene, propylene, butylene, vinyl chloride, vinyl acetate, styrene, α-methylstyrene, vinyl toluenes, vinyl naphthalenes, acrylic esters, methacrylic esters, vinylidene chloride, vinylidene fluoride, vinylidene cyanide, acrylonitrile, methacrylonitrile, acrylamide and dienic monomers.

6. The crosslinkable copolymer composition as claimed in claim 5 wherein the acrylic ester is selected from the group consisting of methyl, ethyl, propyl, n-butyl, iso-butyl, pentyl, hexyl, 2-ethylhexyl, octyl, 2-methoxyethyl and 2-ethoxyethyl acrylates.

7. The crosslinkable copolymer composition as claimed in claim 5 wherein the methacrylic ester is selected from the group consisting of methyl, ethyl, propyl, n-butyl, iso-butyl, pentyl, hexyl, 2-ethylhexyl, octyl, 2-methoxyethyl and 2-ethoxyethyl acrylates.

* * * * *